Dec. 12, 1933. E. J. W. RAGSDALE 1,939,598
SHEET METAL TRUSS STRUCTURE
Filed Feb. 15, 1930 2 Sheets-Sheet 1

INVENTOR.
EARL J.W. RAGSDALE.
BY
John P. Barbor
ATTORNEY.

Dec. 12, 1933.    E. J. W. RAGSDALE    1,939,598
SHEET METAL TRUSS STRUCTURE
Filed Feb. 15, 1930    2 Sheets-Sheet 2
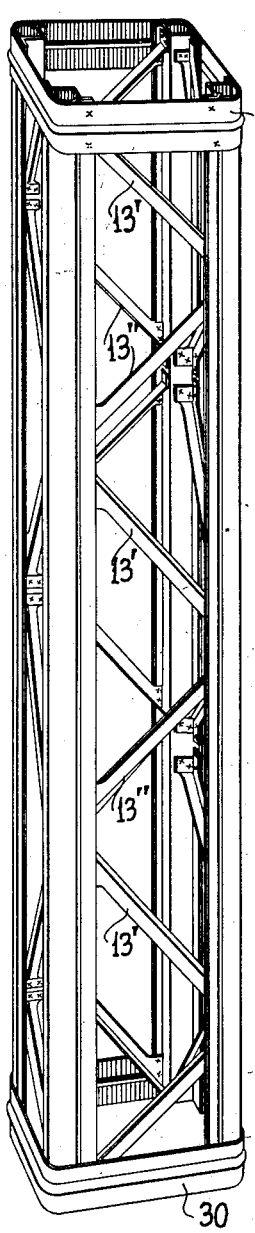
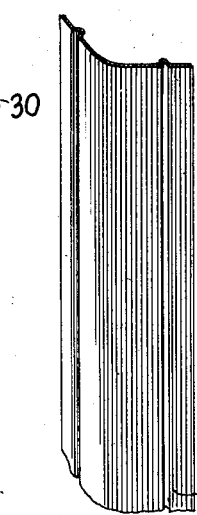
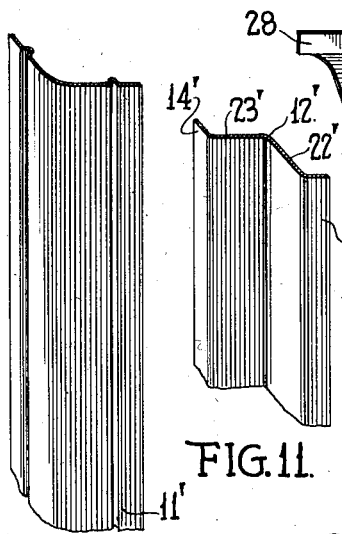
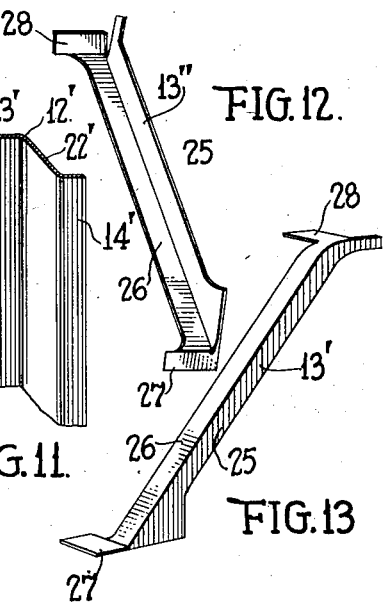
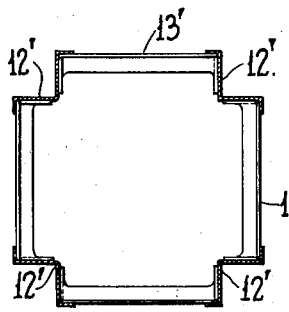
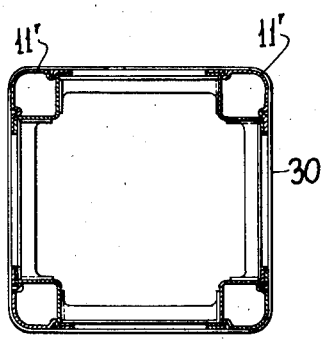
INVENTOR.
EARL J. W. RAGSDALE
BY
ATTORNEY.

Patented Dec. 12, 1933

1,939,598

UNITED STATES PATENT OFFICE 1,939,598

SHEET METAL TRUSS STRUCTURE

Earl J. W. Ragsdale, Norristown, Pa., assignor to Edward G. Budd Manufacturing Company, Philadelphia, Pa., a corporation of Pennsylvania Application February 15, 1930. Serial No. 428,591

9 Claims. (Cl. 189—137)

The invention relates to truss structures and particularly to hollow open truss structures adapted for aircraft construction.

It is a main object of my invention to provide a truss structure of the class described in which the parts are readily formed out of flat sheet metal stock, and readily assembled by that easiest method of joining sheet metal namely, spot welding, and which, when so assembled, a truss structure results which combines the characteristics of lightness, strength and adaptability to a very high degree.

I attain these objects generally by the use of light gauge sheet metal stock, preferably of rustless alloy steel, and by building up the hollow truss structure of longitudinal or chord members comprising inner hollow members opening outwardly and outer hollow members opening inwardly and formed in their margins for ready securement by spot welding or otherwise, and by joining adjacent chord members by web members preferably of hollow section, such as angle section, and having their ends formed to seat against and to be rigidly secured to the inner chord members, as by spot welding prior to the assembly of the outer chord members. Additional strength is attained by providing longitudinally spaced members, such as integral diaphram stampings extending between the inner chord members and formed to be secured thereto as by spot welding. These also are formed preferably of hollow section to give increased strength.

Other and further objects and advantages are attained, as will appear from the following detailed description when read in connection with the attached drawings, showing several embodiments of the invention.

In the drawings,

Fig. 1 shows in perspective a preferred embodiment of my invention in a form well adapted for use as a girder, column, beam or the like.

Figure 1:
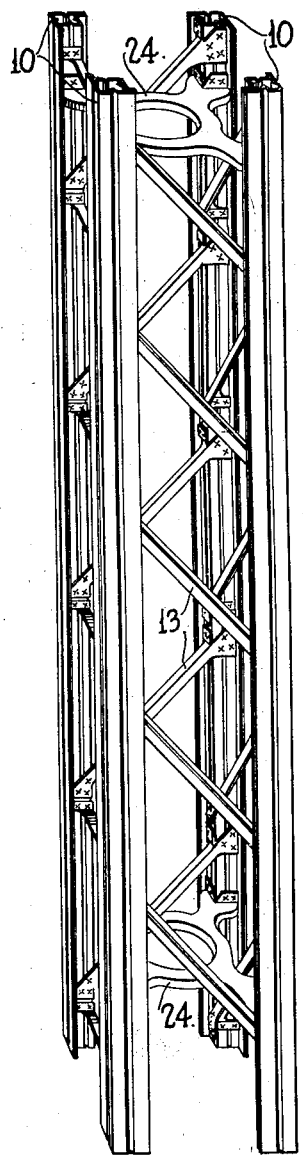
Figures 2, 3:
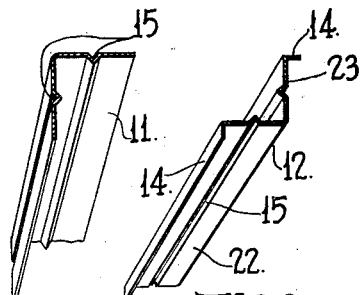
Fig. 2 shows a similar view of a short section of the outer chord members.
Fig. 3 shows a similar view of a short section of the inner chord member.
Figure 4:
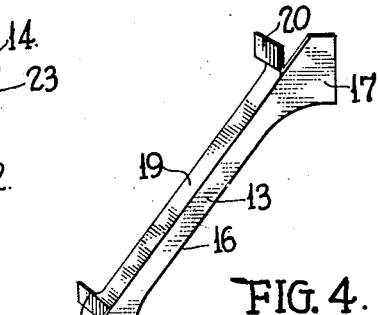
Fig. 4 is a perspective view of a web member according to this form of my invention.
Figure 5:
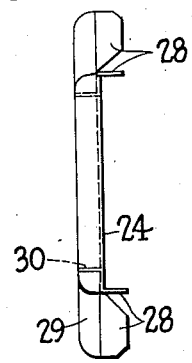
Figs. 5 and 6 show respectively edge and plan view of a diaphragm member according to the form of the invention.
Figure 6:
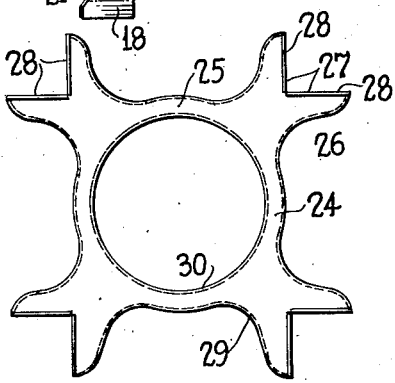

Figs. 9 to 17 inclusive, are views showing a modified form of the invention.

Fig. 9 represents in a perspective view a length of the modified truss structure.

Figs. 10 and 11 represent respectively, short lengths of the outer and inner chord members.

Figs. 12 and 13 represent two forms of web members used in this modified construction.

Fig. 14 represents a length of a tie strip.

Figs. 15, 16 and 17 are end views representing three stages of the assembly.

According to the form of the invention shown in Figs. 1 to 8, the invention is shown as applied to a column structure having four equally spaced chords 10 each built up of an outer member 11 and an inner member 12, and a plurality of web members 13 joining the adjacent chords, the web members according to this form of the invention all extending in the same general direction, producing, when considering the truss structure as a whole, the effect of a plurality of sets of continuous helically arranged webbing.

Each hollow chord 10 comprises an inwardly facing outer hollow section member 11 of angle section, and an outwardly-facing inner hollow section member 12, the latter being formed with lateral edge flanges 14, through which the outer and inner members may be joined, as by spot welding. The chords may be additionally reinforced by inwardly beading the side walls thereof, as shown at 15. The chord members 11 and 12 may be readily formed by rolling them from flat strip stock.

The web members 13 are also of hollow section, such as the angle section shown, and when arranged as shown in the preferred embodiment may all be made identical. When in assembled relation the open side of the angles present outwardly. One arm, as 16, of the angle section is extended at the ends thereof in the plane of the body of the arm and widened out, at 17 and 18, to provide wide overlapping portions through which the web member is secured to the adjacent chords. The other arm 19 of the web member terminates at each end short of the extremities of the other arm and is bent upwardly at 20 and downwardly at 21 to form securing tabs fitting against and secured to the adjacent chords. The tabs 20 and 21 are preferably wider than the width of the body of the arm 19 to provide wide seating surfaces through which it may be secured to the chords, and also to space the body of the web member inwardly of the edge flanges 14 of members 11 for a purpose which will presently appear.

The extremities 20, 17 and 21, 18 form angle members which in the assembly of the web members 13 to the adjacent chords nest with the side walls, as 22 and 23 of the inner chord members 12. When so nested, the parts may be readily secured together as by spot welding.

In practice, in the assembly of the truss structure, I may weld all the web members overlapping one side wall of a chord member at the same time, without removing the welding tool, such as a pinch welder away from the work, this being permitted by reason of the fact that the bodies of the web members are spaced from the edge flanges 14, thus permitting the welding tool to be moved through such space from one end of the chord member to the other. This greatly expedites the operation of welding the web members to the chords.

If desired, the chord members 11 may be held properly spaced, and interbraced by longitudinally spaced diaphragms, as 24, made out of a single stamping having a central portion of annular form at 25 and corner extensions 26 extending out to the chords and provided with angle seats 27 embracing the two side walls 22, 23 of a chord member. These angular seats are laterally flanged, at 28, to form securing tabs through which they are spot welded to the chord members 12. The diaphragms 24 are formed with edge flanges 29 around their outer periphery and with an edge flange 30 around the central opening therein, whereby they are of intercommunicating hollow channel construction which strengthens and reinforces them.

Figure 7:
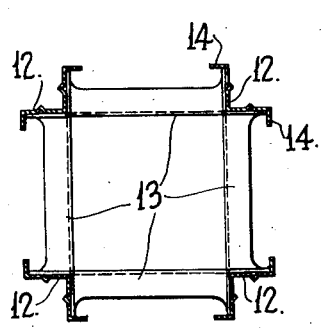
Fig. 7 shows, in end view, the partially assembled truss structure.
Figure 8:
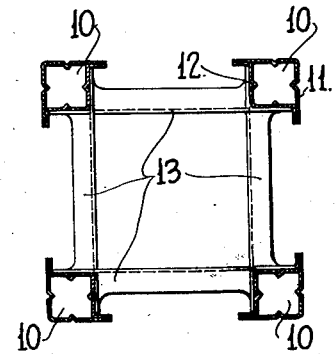
Fig. 8 is a similar view of the completely assembled chord and web structure.

Both the web members 13 and the transverse diaphragms 24 are secured to the inner chord members 12 before the chords 10 are closed by applying the outer chord members 11 to the inner members. Fig. 7 shows the web members applied to the inner chord members and Fig. 8 shows the complete assemblage, with the outer chord members applied to and spot welded to the flanges 14 of the inner members. This final assembling step is also greatly accelerated by reason of the fact that the bodies of the web members 13, as clearly appears in Fig. 8, are spaced from the flanges 14, thereby permitting the welding tool to be slid along the flange to be joined from one end of the structure to the other, without removing the tool from the work.

Another modification of my improved truss structure is shown in Figs. 9 to 17 inclusive. The outer and inner chord members 11', 12', in that construction are essentially the same as in the preferred form, and the web members 13', 13'' of similar cross sectional form to members 13. In this construction, however, I have shown the web members 13', 13'' joining adjacent chord members arranged in zig-zag fashion similar to the Warren type trussing, and I have joined the ends of the web members 13 to a side wall 22' or 23' and its adjacent edge flange 14' rather than to the two side walls of the angle section chord member 12, as in the previous construction.

Web members 13', 13'' are alternately rights and lefts, as can readily be seen by a comparison of Figs. 12 and 13, the member 13' shown in Fig. 13 corresponding to members 13' on Fig. 9 inclined in one direction, and the member 13'' in Fig. 12 being represented in Fig. 9 by the members 13'' inclined in the opposite direction. The one arm, as 25, of members 13' and 13'' is straight throughout and formed at its ends with elongated portions adapted to overlap the edge flanges 14' of adjacent chord members and be secured thereto, and the other arm, as 26, is formed at the ends with oppositely bent away tabs 27 and 28 which are widened out laterally and overlap the adjacent side walls of the outwardly presenting angular chord members 12' and are secured thereto.

In the assembly of this modified form, an opposed pair of trusses may first be assembled, as shown in Fig. 15, and then the web members of the other sides may be assembled to form the hollow structure shown in Fig. 16. After this the outer chord members 11' are assembled by spot welding them to the edge flanges 14' of the inner chord members, and the entire truss structure may be additionally tied together transversely by the longitudinally spaced ribbed bands 30 encircling the outside of the structure and spot welded to the chords through the double thickness of metal where the outer and inner chord members are joined.

If desired, the same diaphragm construction could be used with this form of the invention as in the proceeding form, and the metal ribbed bands 30 might be omitted, or both methods of transverse reinforcement might be employed in either form.

In a truss structure constructed, as hereinbefore described, the characteristics of adaptability for various uses, shapes and length, of strength and of lightness are all present in a very high degree, and such a structure, while capable of general application, is particularly adapted for use in aircraft construction, where a high strength-weight ratio is very important.

While I have herein described specific embodiments of my invention, it will be understood that changes and modifications may be made by those skilled in the art which come within the spirit and scope of the invention, and I intend to cover all such by the following claims.

What I claim is:

1. A hollow sheet metal truss structure comprising hollow chord members built up of inner outwardly facing hollow members and outer members secured to the edges of the inner members, and web members of hollow section having their end portions formed to overlap the inner hollow chord members in at least two intersecting planes and separately secured thereto in said overlap.

2. A hollow sheet metal truss structure comprising chord members of outwardly facing hollow section having edge flanges, and web members connecting adjacent chord members, said web members being of hollow section and formed with end portions adapted to overlap two adjacent walls of said chord members and separately secured thereto.

3. A hollow sheet metal truss structure comprising chord members of outwardly facing hollow section having arms with edge flanges, and hollow section web members having their ends formed to overlap adjacent arms and flanges of adjacent chord members and separately secured thereto.

4. A hollow sheet metal truss structure comprising chord members of outwardly facing hollow section and hollow section web members joining adjacent chord members having their ends formed to provide a substantial overlap with two adjacent inner walls of the outwardly facing chord members and separately secured thereto.

5. A hollow sheet metal truss structure comprising chord members of outwardly facing hollow section, hollow web members joining adjacent chord members through end portions overlapping and secured to two walls of said chord members, and longitudinally spaced transverse diaphragms formed in their periphery with angle seats provided with lateral flanges to receive the chord members, and secured thereto through said lateral flanges.

6. A sheet metal truss structure comprising hollow angle section chord members presenting outwardly, and web members joining adjacent chord members and extending in the same general direction around the structure, the ends of said web members being nested with the angles of the chord members and secured thereto.

7. A sheet metal truss structure comprising hollow chords built up out of inner hollow section members flanged at their edges, and outer members secured to said flanged edges of the inner members, and webbing interconnecting adjacent chord members, comprising hollow section members extending between adjacent chords and having their ends formed to overlap and be separately secured to at least two adjacent walls of the inner members of the chords, all of said parts being secured together by spot welding.

8. A hollow sheet metal truss structure comprising hollow chord members of outwardly facing angular section, and web members of hollow angular section having their angularly related walls extended and widened at the ends into overlapping engagement with corresponding angularly related walls of the chord members and separately secured thereto through said widened extensions.

9. A truss structure having four chords spaced in quadrature each comprising outwardly facing, hollow angular section members, and web members of similar hollow angular section connecting pairs of adjacent chord members, said web members arranged with one wall substantially in a common plane with one wall each of a pair of adjacent chord members and extended and widened into overlapping engagement therewith and secured thereto through said widened extension, and the other wall extending at an angle to the other walls of said pair of chord members and bent and widened at their ends into overlapping engagement with said other walls of the chord members and secured thereto through said widened portions.

EARL J. W. RAGSDALE.